United States Patent [19]
Ogawa et al.

[11] Patent Number: 6,017,152
[45] Date of Patent: Jan. 25, 2000

[54] TRACK ROLLER BEARING WITH STUD AND LUBRICATION PLUG

[75] Inventors: Yoshitaka Ogawa; Isao Ochiai, both of Gifu; Takehiko Hara, Tokyo, all of Japan

[73] Assignee: Nippon Thompson Co., Ltd., Tokyo, Japan

[21] Appl. No.: 09/073,251

[22] Filed: May 6, 1998

[30] Foreign Application Priority Data

May 13, 1997 [JP] Japan .................................. 9-137566

[51] Int. Cl.[7] ...................................................... F16C 33/66
[52] U.S. Cl. ........................... 384/466; 384/449; 384/474
[58] Field of Search ....................... 439/583; 123/90.16; 384/449, 569, 466, 474

[56] References Cited

U.S. PATENT DOCUMENTS 3,989,016  11/1976  Morgan ................................. 123/90.16
5,059,139  10/1991  Spinner ................................. 439/583

*Primary Examiner*—Lenard A. Footland
*Attorney, Agent, or Firm*—Browdy and Neimark

[57] ABSTRACT

An object is to provide a small-sized track roller bearing with stud in which the lubrication feed can be performed after the bearing has been incorporated in a device or the like. In the end surface of a stud 1, a hexagon socket 1r to which a fastening tool can be engaged, is formed, and the hexagon socket 1r and a supply hole 1g of a lubricating passage are connected to each other, and in the hexagon socket 1r, an lubrication plug with an empty hole portion into which a pointed tip of a lubricating device such as an injector can be inserted so as to feed lubrication, is installed.

14 Claims, 8 Drawing Sheets

TRACK ROLLER BEARING WITH STUD AND LUBRICATION PLUG

BACKGROUND OF THE INVENTION

1. Field of the Invention

The present invention relates to a track roller bearing with stud and an lubrication plug used in the track roller bearing with stud which smoothly guide a linear motion or the like in a machine tool, an industrial robot, and the like, and which is most commonly use as a cam follower.

2. Description of the Prior Art

FIG. 1 is an example of a track roller bearing with stud of the prior art.

The track roller bearing with stud comprises a stud 1, an outer ring 2, a side plate 3, a plurality of rollers 4, and a cage 6.

The stud 1 is arranged like an axis, and has a flange 1a, a track surface 1b as a track portion, a side plate insertion portion 1c, an attachment portion 1d, and a threaded portion 1e formed in order from an end surface.

The outer ring 2 has one end portion which is prevented from slipping off in the axial direction by the flange 1a, and is larger than the outside diameter of the flange 1a and is formed like a thick-waled ring, and has a track surface 2b formed on the inner circumference corresponding to the track surface 1b, and is rotatably inserted onto the stud 1.

The plurality of rollers 4 are juxtaposed between the track surface 1b and track surface 2b as rolling elements.

The cage 6 is located between the track surface 1b and track surface 2b so as to retain the plurality of rollers 4 with some spaces.

The side plate 3 is located at the other end portion of the outer ring 2 opposite to the flange 1a, and is formed like a doughnut-plate with an outside diameter approximately equal to the flange 1a, and an inside diameter portion thereof is inserted onto the side plate insertion portion 1c of the stud 1 so as to prevent the outer ring 2, the plurality of rollers 4, and the cage 6 from slipping off in the axial direction, together with the flange 1a.

In the track roller bearing with stud, usually, the outer ring 2 rotates relative to the stud 1.

The stud 1 has a lubricant supply hole 1g approximately through the whole length centered at the axis, and lubrication hole 1h and lubrication hole 1i are opened, which are respectively connected to the track surface 1b and the attachment portion 1g from the supply hole 1g. The supply hole 1g and the lubrication hole 1h and lubrication hole 1i form a lubricating passage for a lubricant. Then, in an end surface of the threaded portion 1e side of the stud 1, a lubricant filler port 1n as a lubricat filler inlet for the lubricant connected to the lubricating passage is formed, and at the lubricant filler port 1n, a grease nipple 15 as a lubricating device is provided.

Furthermore, as shown in FIG. 1 and FIG. 2, in the stud 1, a hexagon socket 1r is formed in an end surface on the flange 1a side. The hexagon socket 1r is formed so that when attaching or removing the track roller bearing with stud, a fastening tool such as a hexagonal wrench may be inserted into the hexagon socket 1r for turning the stud 1.

FIG. 3 shows a common example in service of the track roller bearing with stud.

The track roller bearing with stud is inserted into a housing 8 of a frame equipped on a machine tool or the like, and onto the threaded portion 1e of the stud 1 projecting on the opposite side of the housing 8 of this frame, a nut 11 is screwed through a spring washer 10, and they are fastened and fixed by turning the nut 11 with a wrench or the like, or by turning the stud 1 after engaging a fastening tool such as a hexagonal wrench into the hexagon socket 1r.

Usually, the outside diameter surface of the outer ring 2 slidingly touches the track 13 formed by a track of a straight passage or a track of a cam mechanism, and the outer ring 2 turns and a relative motion to the track 13 is performed.

In the attachment state in FIG. 3, usually, when a grease lubrication is performed, the grease as a lubricant is properly fed to the grease nipple 15 as a lubricating device by a grease gun or the like so as to be filled in the lubricating passage, and is supplied through the lubrication hole 1h to each of the track surface 1b and track surface 2b of the stud 1 and the outer ring 2, and the rollers 4.

For example, in a manufacturing device or the like related to semiconductors, lots of small sized track roller bearing with studs with a nominal diameter of not more than approximately 6 mm, are installed.

In the small sized track roller bearing with stud, there is no space to form a lubricant filler port 1n in an end surface of the threaded portion 1e of the stud 1, and the grease nipple as a lubricating device cannot be arranged and the lubrication feed cannot be performed. Therefore, the lubrication is performed only by the grease as a lubricant first sealed into the track surface.

Accordingly, the replacement of the track roller bearing with stud is performed by disassembling the device before the filled lubricant has been consumed, which takes a lot of time and lab or.

SUMMARY OF THE INVENTION

An object of the present invention is produced due to the above mentioned disadvantage of the prior art, and is to make it possible to feed the lubrication especially into a small sized track roller bearing with stud.

To achieve the object, the present invention is a track roller bearing with stud arranged like an axis, which has a flange, a track portion with an outer circumference to be a track surface, a side plate insertion portion, an attachment portion, and a threaded portion formed in order from one end portion; an outer ring having one end potion prevented from slipping off by the flange in the axial direction and formed like a thick-walled ring larger than the outside diameter of the flange and having a track surface formed on the inner circumference in opposition to the track surface of the stud and rotatably inserted onto the stud; a plurality of rolling elements juxtaposed between the track surfaces; and a side plate located at the other end portion of the outer ring in opposition to the flange and formed like a doughnut plate with an outside diameter approximately equal to that of the flange and inserted onto the side plate insertion portion so as to prevent the outer ring and rolling elements from slipping off in the axial direction together with the flange, and a hexagon socket being formed to be engaged with a fastening tool in an end surface of the stud, and wherein in the hexagon socket, an opening hole connected to the lubricating passage is formed, and an lubrication plug having an empty hole portion into which a pointed tip of a lubricating device such as an injector for lubricating can be inserted so as to feed lubrication, is provided.

Furthermore, the arrangement of the lubrication plug is attached to the hexagon socket by an interference fit after incorporating the track roller bearing with stud in a device to be used.

Furthermore, the lubrication plug has the external shape like a hexagon.

Furthermore, the lubrication plug is made of an elastic body such as a soft rubber, a synthetic rubber, or a synthetic resin.

Furthermore, the lubrication plug is formed in such a way that an elastic body with an empty hole portion is wrapped in and fixed to an outer collar made of a steel sheet, and the external shape is hexagonal.

Furthermore, to the elastic body of the lubrication plug, a nonreturn lip and a nonreturn action space are provided in the innermost of the empty hole portion.

Furthermore, to the elastic body of the lubrication plug, a dust-seal lip is formed at the end portion of the empty hole portion.

Furthermore, to the lubrication plug, a flange is provided at the end portion.

Furthermore, the lubrication plug is formed in such a way that an elastic body covers a metal collar and in the central portion of the elastic body, there is an empty hole portion, and is attached to the bottom portion of the hexagon socket.

Furthermore, the empty hole portion is a tapered hole and an end portion is closed, and when a pointed tip of a lubricating device is inserted, the end portion is opened.

Furthermore, the present invention including an lubrication plug which is used by being inserted onto a hexagon socket formed in the end surface of a track roller bearing with stud, wherein the lubrication plug has an external shape of a hexagon and is made of an elastic body such as a soft rubber, a synthetic rubber, or a synthetic resin, and in the central portion of the elastic body, an empty hole portion into which a pointed tip of a lubricating device such as an injector for lubricating can be inserted from the end portion so as to feed lubrication, is formed, and in the innermost of the empty hole portion, a nonreturn lip and a nonreturn action space are provided.

Furthermore, to the elastic body of the lubrication plug, a dust-seal lip is formed, which is closed after the lubricating device has been pulled out of the end portion of the empty hole portion.

Furthermore, the elastic body is wrapped in an outer collar made of a steel sheet.

Furthermore, the lubrication plug which is inserted onto a hexagon socket formed in the end surface of a track roller bearing with stud so as to be used, wherein the lubrication plug is formed in such a way that a metal collar is covered by an elastic body such as a soft rubber, a synthetic rubber, or a synthetic resin and there is an empty hole portion in the central portion of the elastic body, and is attached to the bottom portion of the hexagon socket.

DESCRIPTION OF THE PREFERRED EMBODIMENTS

Figure 1:
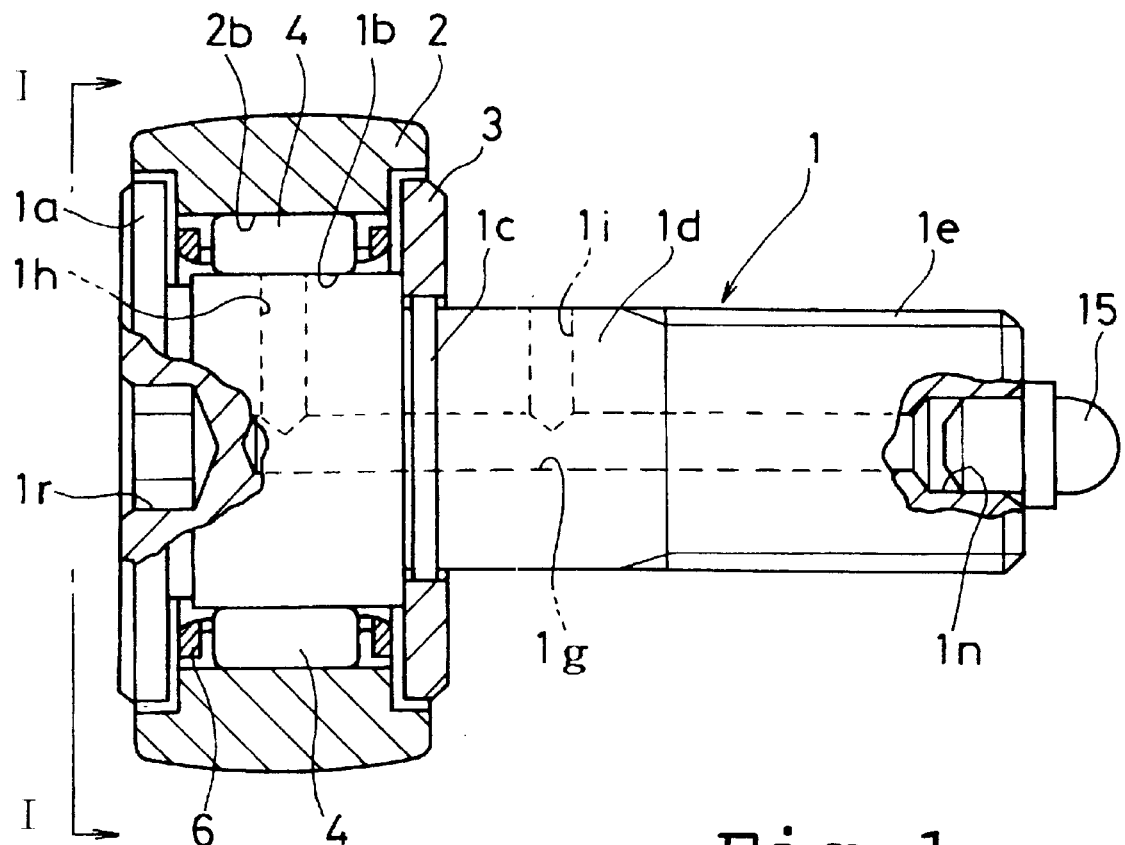
FIG. 1 is a front view partly including cross sections of a track roller bearing with stud of the prior art.
Figure 2:
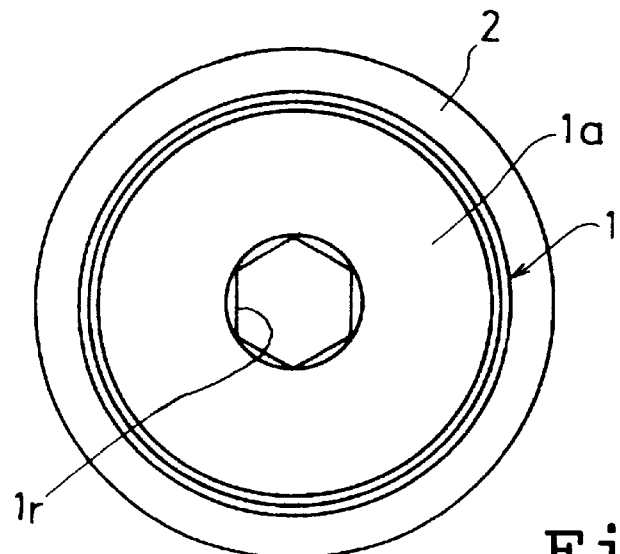
FIG. 2 is a figure shown by the arrow I—I of FIG. 1.

The embodiments of a track roller bearing with stud and an lubrication plug according to the present invention will be described below by referring to the drawings. However, the portions having the structure and function equal to those of a track roller bearing with stud of the prior art are omitted because the description is repeated, and the principal parts will only be described. In the following drawings, the parts having the structure and function equal to those of a track roller bearing with stud of the prior art shown in FIG. 1 are given the same signs.

Figure 4:
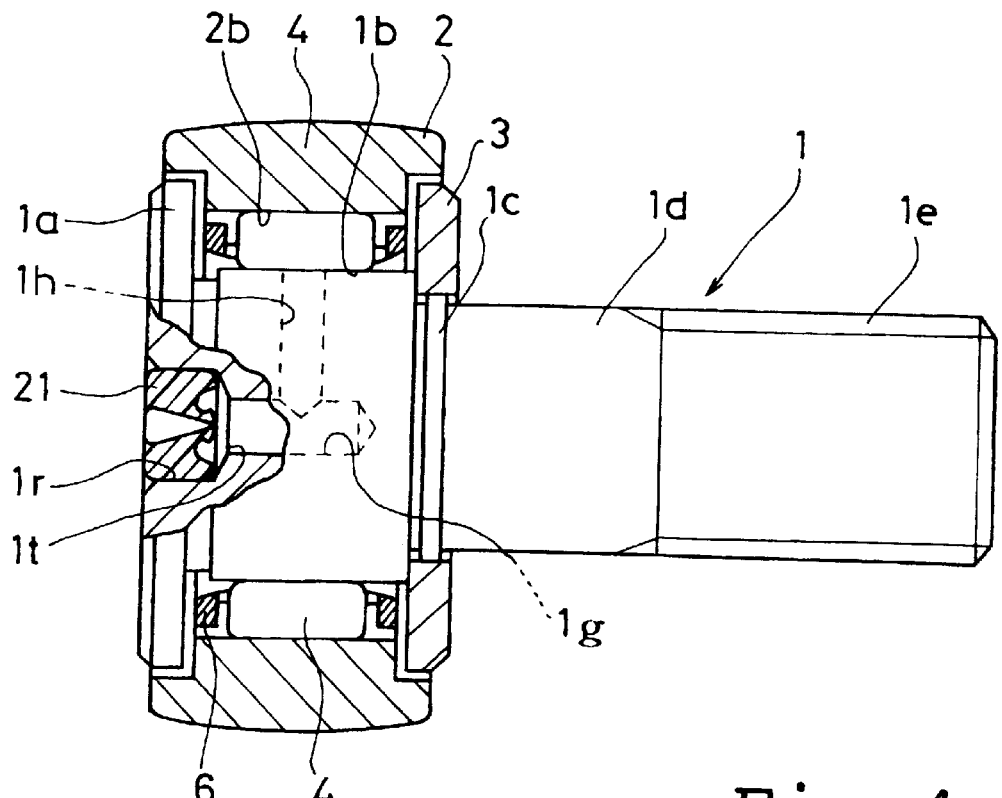
FIG. 4 is a front view partly including cross sections of the track roller bearing with stud showing a first embodiment of the present invention.
Figure 5:
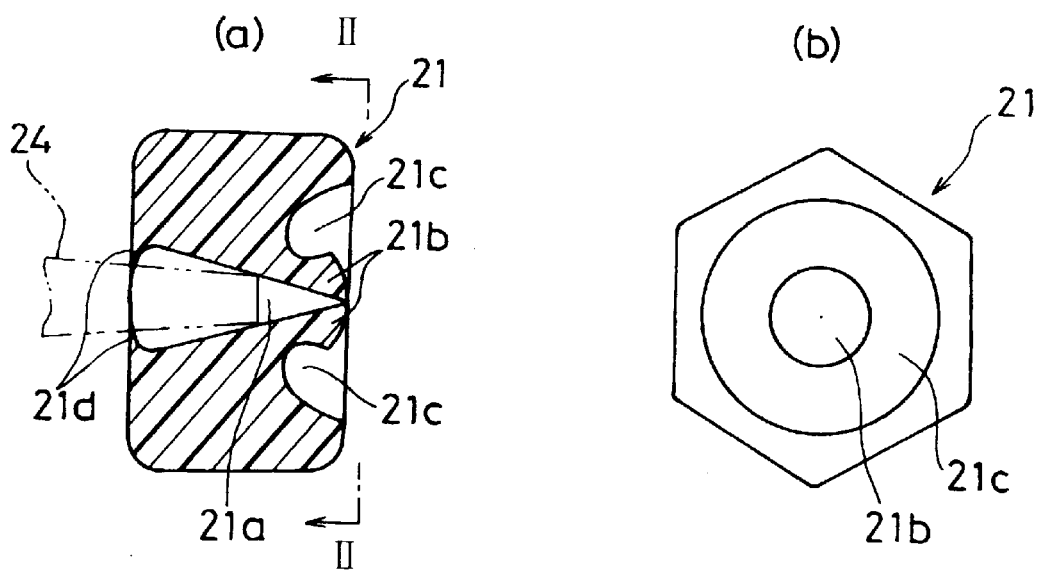
FIG. 5 is a figure showing a first embodiment of an lubrication plug installed into the track roller bearing with stud in FIG. 4, and (a) is a vertical cross sectional view and (b) is a figure shown by the arrow I—I of (a)

FIG. 4 is a front view partly including cross sections showing a first embodiment of the track roller bearing with stud according to the present invention. FIG. 5 is a figure showing an lubrication plug to be installed to the track roller bearing with stud in FIG. 4.

The track roller bearing with stud of the first embodiment is characterized in that especially in a case of a small sized one which has no space to form a lubricant filler port in the end surface of a threaded portion 1e of the stud 1 and which cannot be arranged on a grease nipple as a lubricating device, and specifically in a case of a small sized one with a nominal diameter (outside diameter of the attachment portion 1d of the stud 1) of approximately not more than 6 mm, an opening hole 1t connected to the lubricant supply hole 1g is formed in the bottom portion of the hexagon socket 1r of the stud 1, and in the hexagon socket 1r, an lubrication plug 21 into which a pointed tip of a lubricating device 24 such as an injector for lubricating is inserted so that the lubrication may be fed into the lubricating passage, is installed.

In this case, the lubricating passage is not a passage extending approximately through the whole length centered at the axis, because there is no space to form a lubricant filler port in the threaded portion 1 e of the stud 1. Only in the track portion, a supply hole 1g is formed and a lubrication hole 1h is opened from the supply hole 1g to the track surface 1b.

Here, by referring to FIG. 5, the lubrication plug 21 will be described. (a) is a vertical cross sectional view of the lubrication plug 21, and (b) is a figure shown by the arrow II—II of (a).

The lubrication plug 21 is like a hexagonal pillar with an external shape of a hexagon corresponding to the hexagon socket 1r of the stud 1, and is made of an elastic body such as a soft rubber, a synthetic rubber, or a synthetic resin, and is attached into the hexagon socket 1r by the interference fit with no clearance and with high adhesion so that the lubricant may not leak.

Furthermore, in the lubrication plug 21, as shown in FIG. 5 (a), an empty hole portion 21a is formed in the central portion, which comprises an empty hole into which a pointed tip of a lubricating device 24 such as an injector for feeding the lubricant can be inserted; and an extremely small empty hole for preventing the fed lubricant from leaking, preferably a closed empty hole.

Furthermore, the lubrication plug 21 comprises an empty hole portion 21a whose diameter is gradually reduced from one end to the other end in the axial direction so that a pointed tip of the lubricating device 24 may be inserted; and a nonreturn lip 21b composed of an empty hole which is closed so as to prevent the lubricant fed into the innermost of the empty hole portion 21a from leaking, and further, a nonreturn action space 21c which operates so as to close the nonreturn lip 21b when an internal pressure is added because of the leak of the lubricant or the like, and a dust-seal lip 21d composed of a closed empty hole which is closed, after the lubricating device 24 has been pulled off, so as to prevent dirt, dust or the like from entering the empty hole portion 21a, are provided at the end portion of the empty hole portion 21a.

Figure 3:
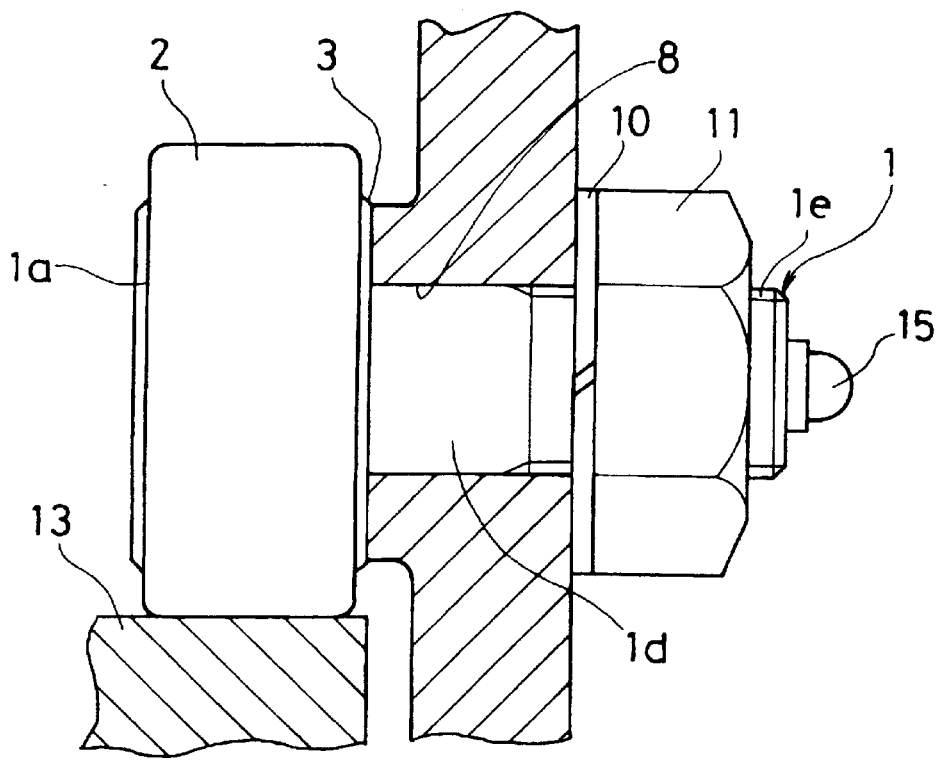
FIG. 3 is a front view partly including cross sections showing a state which the track roller bearing with stud in FIG. 1 is incorporated in some device.

The track roller bearing with stud of the present embodiment is incorporated in a machine tool or the like similarly to the example in service shown in FIG. 3, and is inserted into a housing 8 of a frame equipped with the machine tool or the like. Then, onto the threaded portion 1e of the stud 1 projecting on the opposite side of the housing 8 of the frame, a nut 11 is screwed through a spring washer 10, and by turning the nut 11 with a wrench or the like, or by turning the stud 1 with a fastening tool such as a hexagonal wrench engaged with the hexagon socket 1r, the track roller bearing with stud is fastened and fixed and attached.

Accordingly, usually, the lubrication plug 21 is attached into the hexagon socket 1r by the interference fit after incorporating the track roller bearing with stud in a device, so that it may not easily be dropped off by the vibration or the like.

After the installation, if necessary, a lubrication feed, for example, a grease pouring is properly performed.

As shown in FIG. 5 (a), a pointed tip of a lubricating device 24 is inserted into the empty hole portion 21a and pressure is added so as to pour the grease.

The poured grease is supplied from the opening hole it shown in FIG. 4 through the supply hole 1g and the lubrication hole 1h to each of the track surface 1b and track surface 2b of the stud 1 and the outer ring 2, and the rollers 4.

When the grease is filled, an internal pressure of the grease is added to the nonreturn action space 21c formed in the lubrication plug 21, and a force in the direction of closing the nonreturn lip 21b operates so as to prevent the grease from leaking.

Furthermore, after the lubricating device 24 has been pulled off, the dust-seal lip 21d formed to the lubrication plug 21 closes so as to prevent dirt, dust, or the like from entering the empty hole portion 21a.

Since the track roller bearing with stud of the present embodiment can be lubricated, the jobs of disassembling the device and replacing the bearing itself when the lubricant is exhausted, becomes unnecessary, which contributes to the decreasing of operating costs.

By referring to FIG. 6, a second embodiment of the track roller bearing with stud will be described.

The second embodiment is a middle-sized track roller bearing with stud similar to the example of the prior art shown in FIG. 1. In the axial center of the stud 1, a supply hole 1g as a lubricating passage of the lubricant is formed approximately through the whole length, and from the supply hole 1g, lubrication holes 1h and 1i respectively connected to the track surface 1b and the attachment portion 1d are opened, and in the end surface of the threaded portion 1e, a lubricant filler port can be formed, in which a grease nipple 15 as a lubricating device may be installed.

Figure 6:
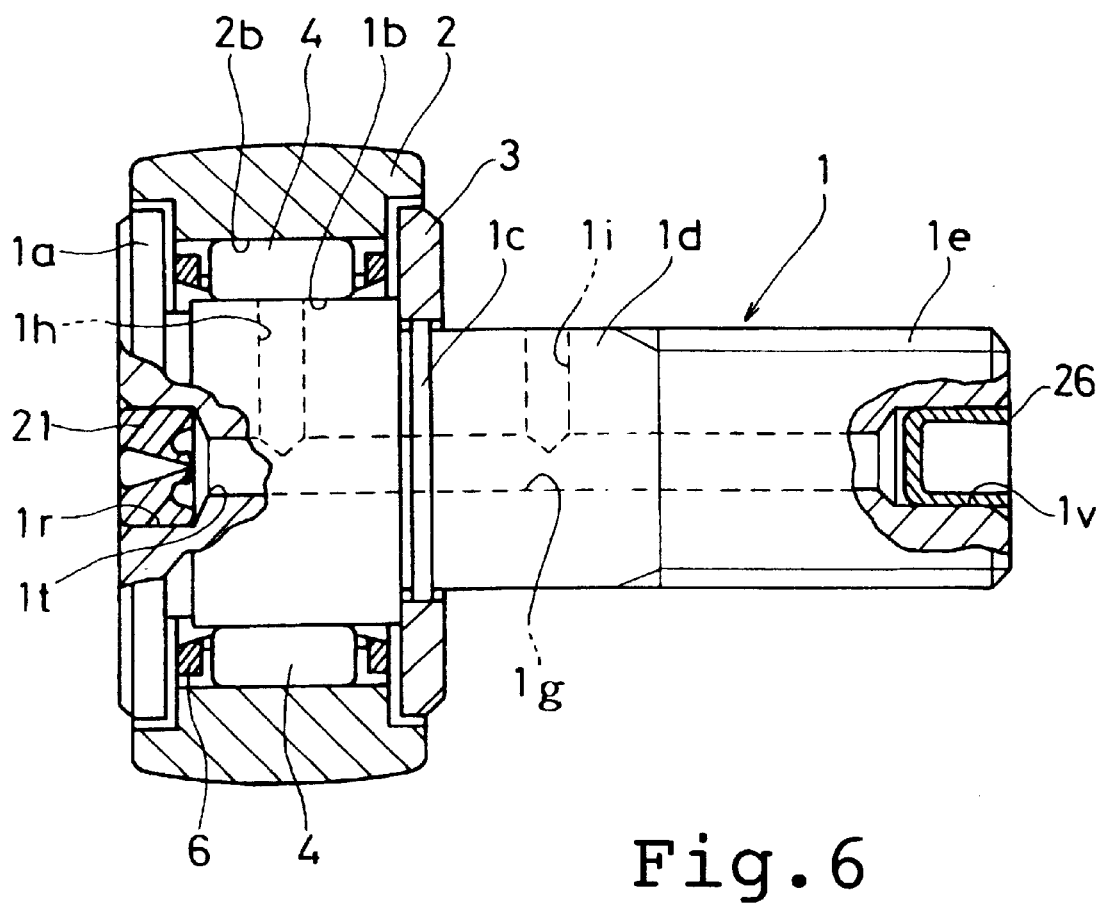
FIG. 6 is a front view partly including cross sections showing a second embodiment of the track roller bearing with stud.

As shown in FIG.6, the track roller bearing with stud of the second embodiment is a bearing, wherein into the lubricant filler port 1v in the end surface of the threaded portion 1e of the stud 1, an embedded plug 26 is inserted, and especially, in the bottom portion of the hexagon socket 1r, an opening hole 1t connected to the supply hole 1g of the lubricating passage is formed, and the lubrication feed is performed by inserting the pointed tip of a lubricating device 24 such as an injector into the lubrication plug 21 attached into the hexagon socket 1r, and wherein unlike the lubrication feed in the bearings of the prior art, the lubrication feed can be performed on the hexagon socket 1r side.

Figure 7:
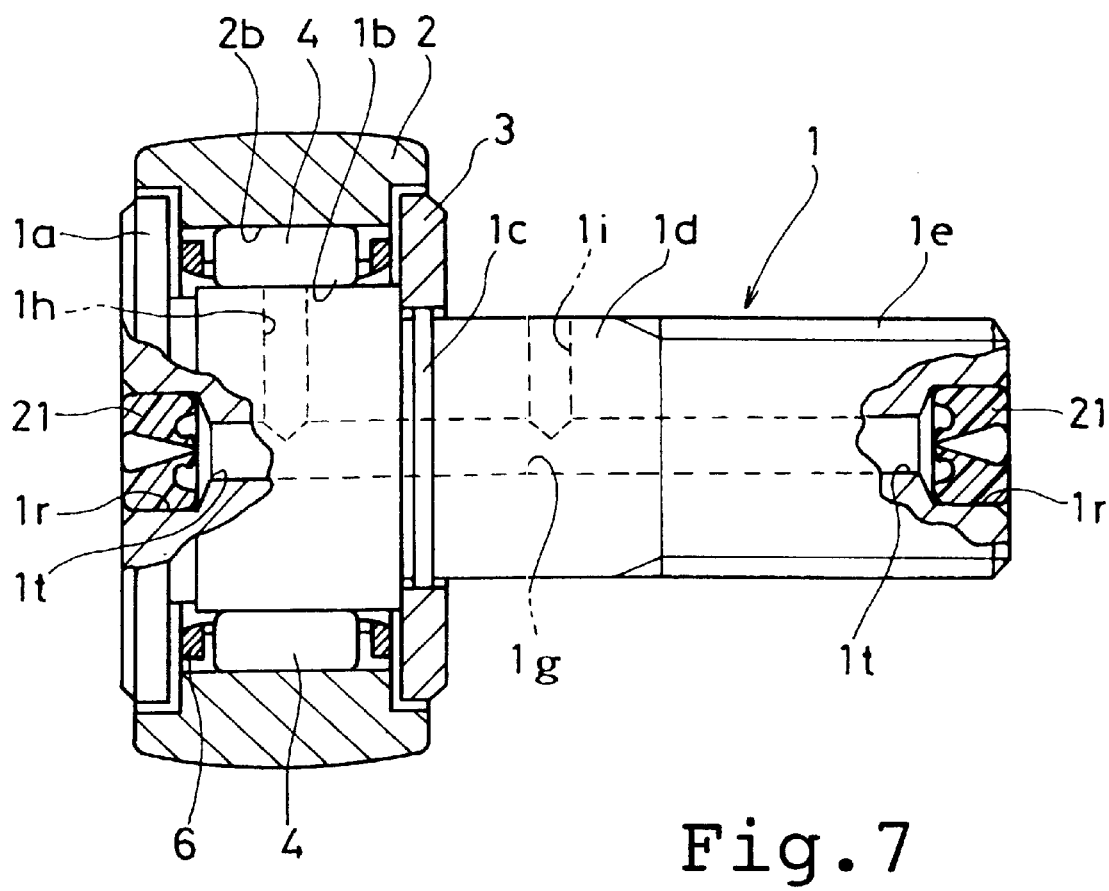
FIG. 7 is a front view partly including cross sections showing a third embodiment of the track roller bearing with stud.

By referring to FIG. 7, a third embodiment of the track roller bearing with stud will be described.

The track roller bearing with stud of the third embodiment is a large-sized one as compared with the middle-sized track roller bearing with stud of the second embodiment, wherein in the end surface of the threaded portion 1e, a hexagon socket 1r is formed, too, and especially, in the bottom portion of the hexagon socket 1r, an opening hole it connected to the supply hole 1g of the lubricating passage, is formed, and the lubrication feed is performed by inserting the pointed tip of a lubricating device 24 such as an injector into the lubrication plug 21 attached to the hexagon socket 1r, and wherein it is unnecessary to provide a lubricant filler port for attaching a lubricating device of the prior art and the lubrication feed can be performed through the hexagon socket 1r.

Figure 8:
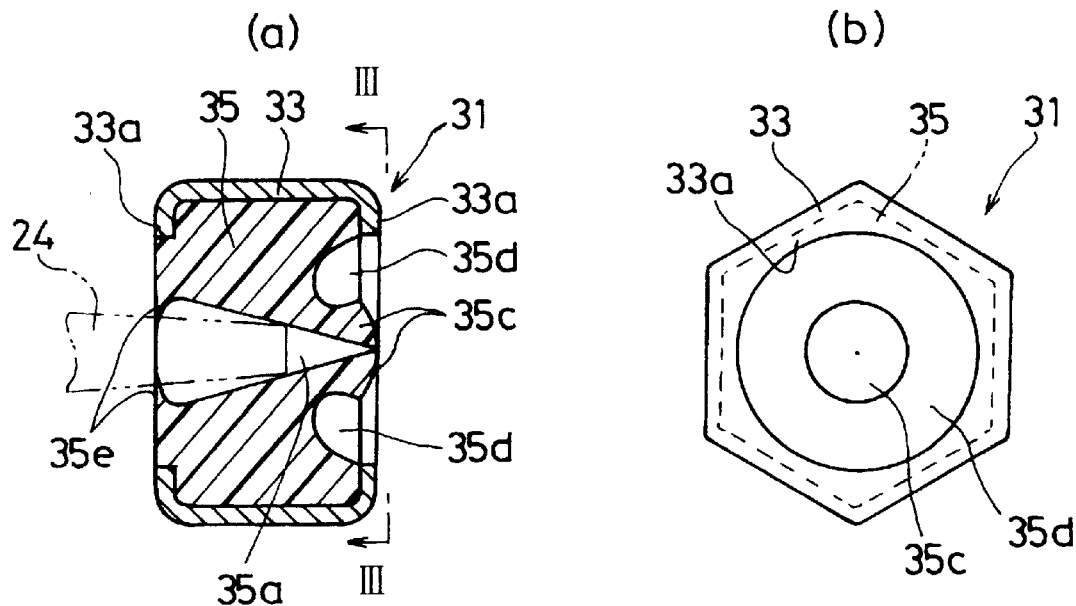
FIG. 8 is a figure showing a fourth embodiment of the lubrication plug, and (a) is a vertical cross sectional view and (b) is a figure shown by the arrow II—II of (a)

Next, by referring to FIG. 8, a fourth embodiment composed of another lubrication plug will be described.

(a) shows a vertical cross section of an lubrication plug 31, and (b) is a figure shown by the arrow III—II of (a).

The lubrication plug 31 is a plug to be attached to a hexagon socket of a track roller bearing with stud of the first embodiment, the second embodiment, and the third embodiment, and it is made of a steel sheet subjected to press working or the like, and is composed of an approximately cylindrical outer collar 33 with an external shape of a hexagon, and an elastic body 35 which is included in and fixed to the outer collar 33 by an adhesive or the like and which is made of a soft rubber, a synthetic rubber, a synthetic resin, or the like.

In the elastic body 35, similarly to the lubrication plug 21 of the first embodiment, an empty hole portion 35a whose diameter is gradually decreased from one end to the other end in the axial direction, a nonreturn lip 35c and a nonreturn action space 35d located at the innermost of the empty hole portion 35a, and a dust-seal lip 35e located at the end portion on this side of the empty hole portion 35a are provided.

Furthermore, the outer collar 33 has both end portions composed of rib portions 33a overhanging inward, so as to be a clamp to prevent the elastic body 35 from slipping off, too.

Since the lubrication plug 31 has the outer collar 33, the insertion of the stud 1 into the hexagon socket 1r is solid, and even if a strong vibration or a strong shock is added, falling off may not easily occur.

Figure 9:
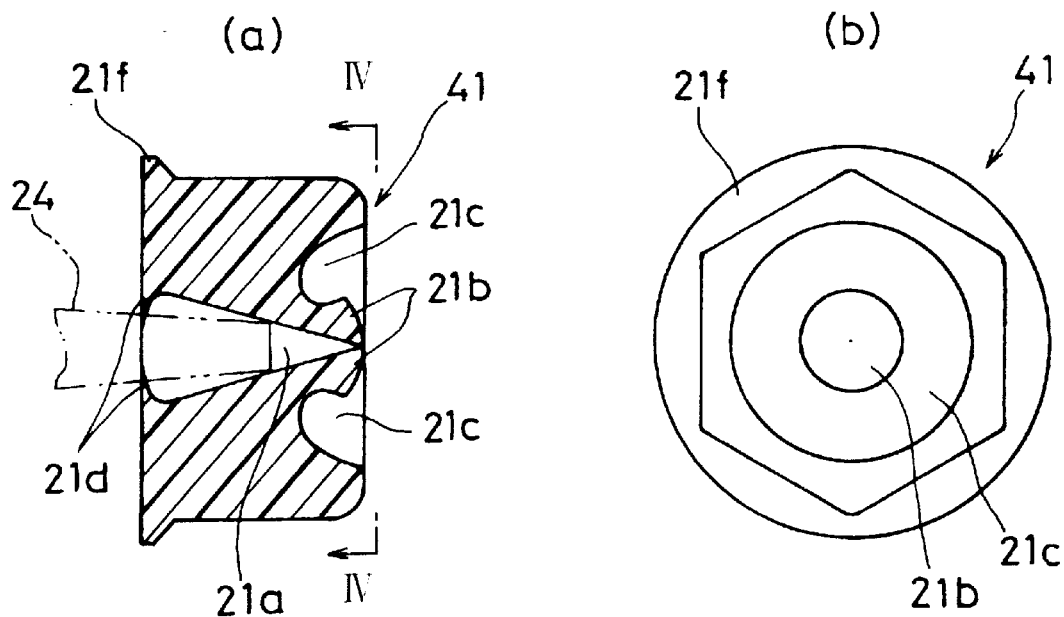
FIG. 9 is a figure showing a fifth embodiment of the lubrication plug, and (a) is a vertical cross sectional view and (b) is a figure shown by the arrow IV—IV of (a)
Figure 10:
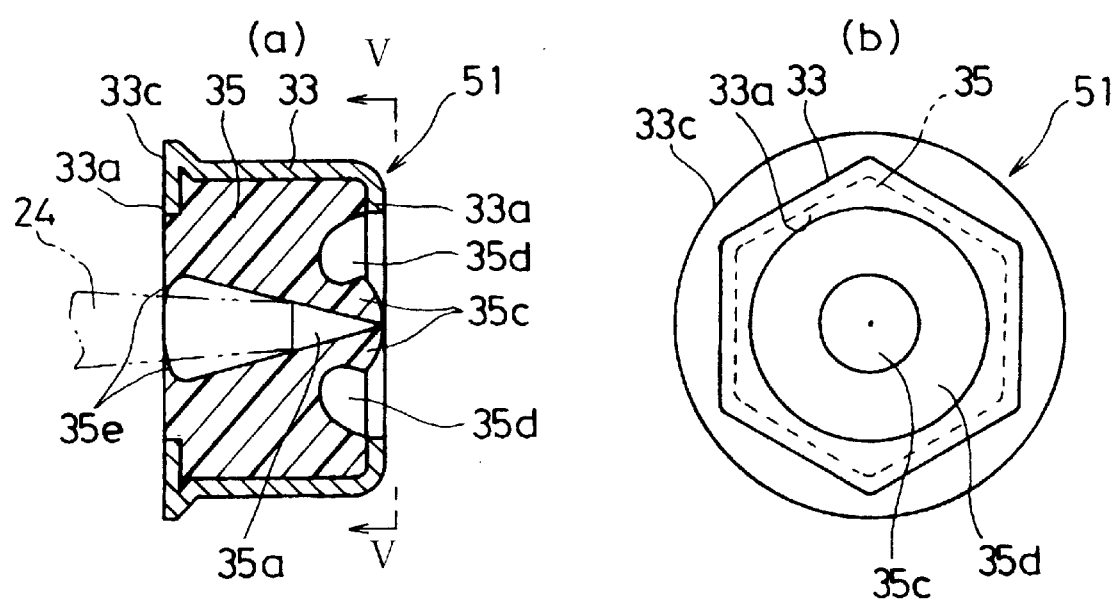
FIG. 10 is a figure showing another lubrication plug similar to FIG. 9, and (a) is a vertical cross sectional view and (b) is a figure shown by the arrow V—V of (a)

Next, by referring to FIG. 9 and FIG. 10, a fifth embodiment composed of another lubrication plug will further be described.

The lubrication plug 41 and the lubrication plug 51 have, as compared with the lubrication plug 21 and the lubrication plug 31 of the first embodiment and the fourth embodiment, the same arrangements except that flange 21f and flange 33c are formed on the external shape sides of the end portions on the dust-seal lip 21d, 35e sides.

Since the flange 21f and flange 33c are formed, the flange 21f and flange 33c are fit at the mouth chamfer portion of the hexagon socket 1r of the stud 1, so that the lubrication plug 41 and the lubrication plug 51 may not be embedded in the hexagon socket 1r, and in a case when after the track roller bearing with stud has been incorporated in a machine tool or the like, and the hexagonal wrench is once more inserted into the hexagon socket 1r so as to refasten the stud 1, it is easier to grip the flange 21f and flange 33c and to take the lubrication plug 41 or the lubrication plug 51 out of the hexagon socket 1r.

Next, by referring to FIG. 11 and FIG. 12, a sixth embodiment composed of another lubrication plug will be described.

Figure 11:
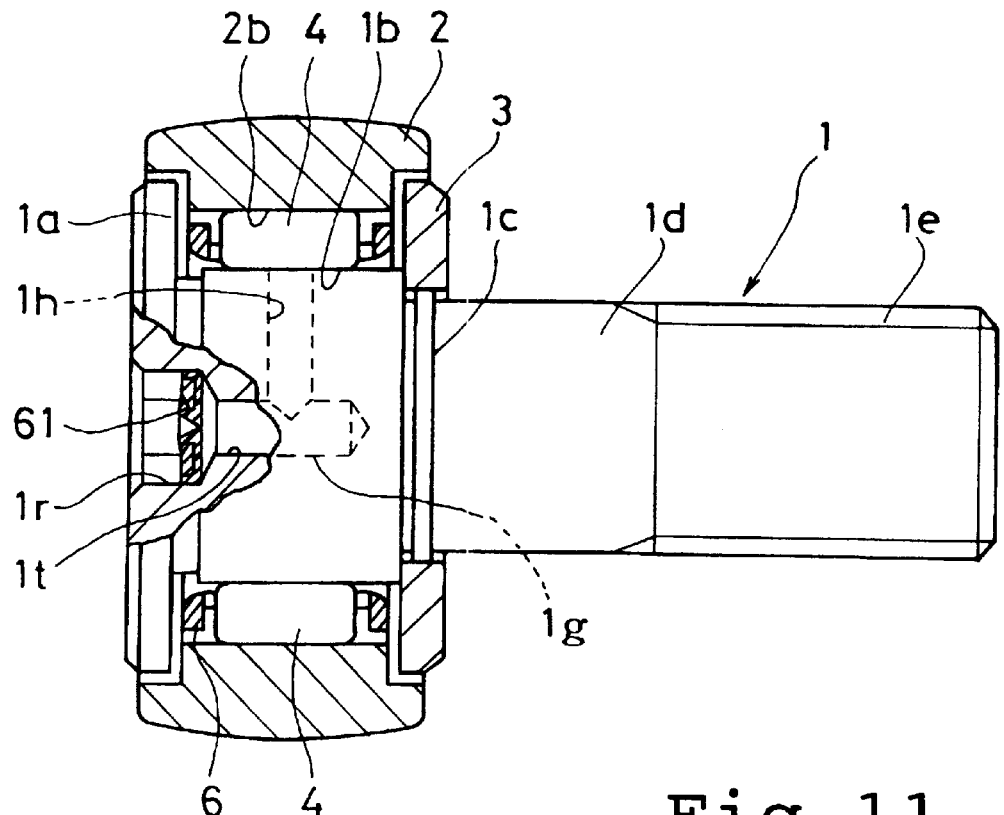
FIG. 11 is a front view partly including cross sections showing a sixth embodiment of the track roller bearing with stud.

The lubrication plug 61 is a plug to be attached to a hexagon socket of the track roller bearing with stud of the first embodiment to the third embodiment, and especially, as shown in FIG. 11, a plug to be attached to the bottom portion of the hexagon socket 1r of the stud 1.

Figure 12:
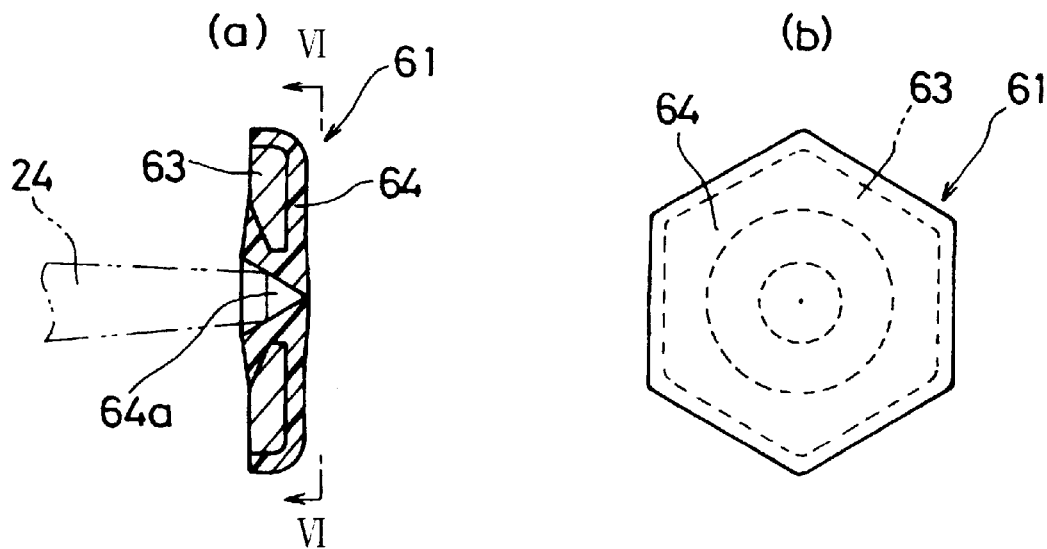
FIG. 12 is a figure showing the lubrication plug in FIG. 11, and (a) is a vertical cross sectional view and (b) is a figure shown by the arrow VI—VI of (a).

FIG. 12 (a) shows a vertical cross section of the lubrication plug 61, and (b) is a figure shown by the arrow VI—VI of (a).

The lubrication plug 61 comprises a metal collar 63 and an elastic body 64 covering the metal collar 63, such as a soft rubber, another synthetic rubber, or a synthetic resin. It is a so-called flat type one with a hexagonal external shape and with a thin thickness.

In the central portion of the elastic body 64, an empty hole portion 64a is formed, which is a tapered hole having a diameter gradually decreasing from one side to the other side in the direction of thickness, and which has a blocked innermost end portion.

The empty hole portion 64a is arranged such that if a pointed tip of a lubricating device 24 is inserted in a state where the innermost end portion is blocked, the end portion is opened and the supply of the lubricant is performed, and if the lubricating device 24 is pulled off, the end portion is blocked and operates to prevent the filled lubricant from leaking.

Since the flat type lubrication plug 61 can be attached to the bottom portion of the hexagon socket 1r, a hexagonal wrench can be engaged with the hexagon socket 1r so as to perform the job of fastening or loosening of the stud 1, without removing the lubrication plug 61.

Furthermore, in each of the embodiments, rollers 4 are used as rolling elements, but balls may also be used.

Furthermore, the track roller bearing with stud of each of the embodiments may be a track roller bearing with stud having a sealing member.

By the above mentioned arrangement, the track roller bearing with stud and the lubrication plug of the present invention can feed lubrication, especially to a small-sized track roller bearing with stud, and the jobs to disassemble the device and to replace the bearing itself before the first filled lubricant has been exhausted, become unnecessary, which contributes to the decreasing of operating costs.

Furthermore, in a middle-sized track roller bearing with stud, and in a large-sized track roller bearing with stud, the lubrication feed through the hexagon socket of the stud is also possible, which makes it easy to treat the job of lubrication feed.

What is claimed is:

1. A track roller bearing with stud comprising:

a stud arranged like an axis which has a flange, a track portion having an outer circumference to be a track surface, a side plate insertion portion, an attachment portion, and a threaded portion are formed in order from one end portion;

an outer ring whose one end portion is prevented from slipping off by said flange in the axial direction and which is formed like a thick-walled ring larger than the outside diameter of said flange and which has a track surface formed on the inner circumference in opposition to the track surface of said stud and which is rotatably inserted onto said stud;

a plurality of rolling elements which are juxtaposed between said track surfaces; and a side plate which is located at the other end portion of said outer ring in opposition to said flange and which is formed like a doughnut plate with an outside diameter approximately equal to that of said flange and which is inserted onto said side plate insertion portion so as to prevent said outer ring and said rolling elements from slipping off in the axial direction together with said flange, a hexagon socket being to be engaged with a fastening tool in an end surface of said stud, wherein in said hexagon socket, an opening hole connected to a lubricating passage is formed, and an lubrication plug having an empty hole portion into which a pointed tip of a lubricating device such as an injector for lubricating can be inserted so as to feed lubrication, is provided.

2. A track roller bearing with stud described in claim 1, wherein the arrangement of said lubrication plug is attached to said hexagon socket by an interference fit after incorporating said track roller bearing with stud in a device to be used.

3. A track roller bearing with stud described in claim 1, wherein said lubrication plug has an external shape like a hexagon.

4. A track roller bearing with stud described in claim 1, wherein said lubrication plug is formed in such a way that an elastic body with an empty hole portion is wrapped in and fixed to an outer collar made of a steel sheet, and the external shape is hexagonal.

5. A track roller bearing with stud described in claim 1, wherein said lubrication plug is made of an elastic body such as a soft rubber, a synthetic rubber, or a synthetic resin.

6. A track roller bearing with stud described in claim 4, wherein to an elastic body of said lubrication plug, a nonreturn lip and a nonreturn action space are provided in the innermost of said empty hole portion.

7. A track roller bearing with stud described in claim 4, wherein to an elastic body of said lubrication plug, a dust-seal lip is formed at an end portion of said empty hole portion.

8. A track roller bearing with stud described in claim 1, wherein to said lubrication plug, a flange is provided at an end portion.

9. A track roller bearing with stud described in claim 1, wherein said lubrication plug is formed in such a way that an elastic body covers a metal collar and in the central portion of said elastic body, there is an empty hole portion, and is attached to the bottom portion of said hexagon socket.

10. A track roller bearing with stud described in claim 9, wherein said empty hole portion is a tapered hole and an end portion is closed, and when a pointed tip of a lubricating device is inserted, the end portion is opened.

11. A lubrication plug which is used by being inserted onto a hexagon socket formed in the end surface of a track roller bearing with stud, wherein said lubrication plug has an external shape of a hexagon and is made of an elastic body, and wherein in the central portion of said elastic body, an empty hole portion into which a pointed tip of a lubricating device such as an injector for lubricating can be inserted from an end portion so as to feed lubrication, is formed, and in the innermost of said empty hole portion, a nonreturn lip and a nonreturn action space are provided.

12. A lubrication plug described in claim 11, wherein to an elastic body of said lubrication plug, a dust-seal lip which is closed after said lubricating device has been pulled out of an end portion of said empty hole portion, is formed.

13. A lubrication plug described in claim 11, wherein said elastic body is wrapped in an outer collar made of a steel sheet.

14. A lubrication plug in accordance with claim 11, wherein said elastic body is made of a soft rubber, a synthetic rubber, or a synthetic resin.

* * * * *